Patented July 6, 1926.

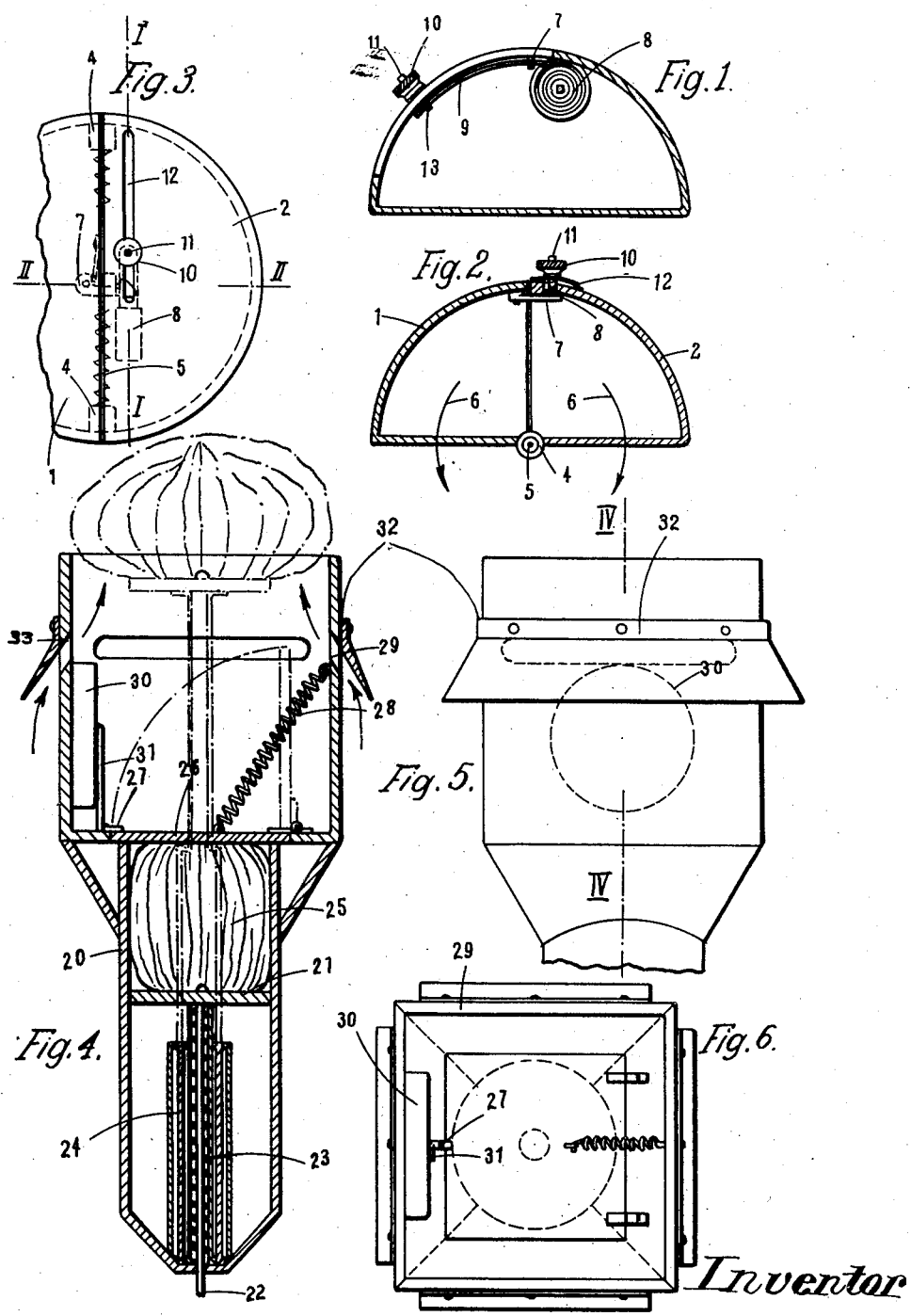

1,591,493

UNITED STATES PATENT OFFICE.

MARCEL KÜNZER, OF LA CHAUX-DE-FONDS, SWITZERLAND, ASSIGNOR TO SOCIÉTÉ ANONYME POUR L'EXPLOITATION DES BREVETS KÜNZER, OF BALE, SWITZERLAND.

AUTOMATIC UNFOLDING DEVICE FOR PARACHUTES.

Application filed April 14, 1925, Serial No. 23,001, and in Switzerland September 17, 1924.

The present invention relates to an automatic unfolding device for parachutes. In order to fulfill its object the device comprises a casing enclosing the parachute in a folded state. The casing is kept closed against the effect of springs by means of a locking device which is controlled by a timing mechanism.

The annexed drawing represents two working forms of a device constructed according to the present invention.

Fig. 1 is a vertical section of a first working form and on line I—I of Fig. 3.

Fig. 2 is a section on line II—II of Fig. 3.

Fig. 3 is a plan.

Fig. 4 is a vertical section of a second working form on line IV—IV of Fig. 5.

Fig. 5 is a side elevation and Fig. 6 a plan.

Referring to Figs. 1 to 3, 1 and 2 are two halves of a casing, which when closed has a semi-spherical shape. The said two halves are connected together by means of hinges 4, and a spring 5 is wound around and fixed to the pin of said hinges so that the two halves have a tendency to spread out in the directions of the arrows 6 in Fig. 2. The effect of this spring 5 is counteracted by a hook 7 which fixed to the part 1 is engaged into a notch of part 2. A spiral spring 8 is attached at one end to a stud fast to part 2 and with its other end to a metal strip 9 which carries at its other extremity a riveted bolt 11 with a nut 10. Underneath this nut there is a flat spring which as a brake is in frictional contact with both sides of a slot 12 through which said bolt is extended. The bolt 11 is provided at its inner end with a catch 13 which after having travelled to the end of slot 12 under the effect of spring 8 will push aside hook 7 so as to free the two halves of the casing which will open under the effect of spring 5.

A parachute is folded together inside of the casing in such a way that when the two halves of the casing part asunder it will be thrown out by the sudden jerk and be unfolded and begin to fall loaded by the weight of the casing.

The time of opening of the casing is determined by the distance at which bolt 11 is adjusted within slot 12 that is by the amount of stretch given to spring 8 and by the pressure exerted by the nut 10 on the flat spring which has to act as a brake.

When the apparatus is used the parachute is folded and put inside the casing. The two halves are closed and locked by means of hook 7. Before throwing out the apparatus the spiral spring 5 is stretched by moving nut 10 along the slot 12 and the brake spring is then regulated by tightening more or less said nut. Thus the time may be determined, after which hook 7 will be unlocked.

In the second working form according to Figs. 4 to 6 a casing 20 is provided with a movable bottom 21 which is under the effect of a helical spring 23 wound on the rod 22. Spring and rod are arranged inside of three telescoping tubes 24. Rod 22 serves simply as means for compressing spring 23. The folded parachute 25 is deposited on the bottom 21 underneath the hinged flap 26 which is held closed against the effect of a spring 28 by a latch 27. The top of the casing 20 is formed of a wind screen 29 formed of vertical walls unto one of which spring 28 is attached and to another a clock work 30 which is adapted to act by means of an extended arm on the latch 27 so as to free the flap 26. The walls of the wind screen are provided with slots 33 having guiding surfaces fixed above the same. These surfaces are intended to direct the air draught produced along the sides of the casing to the inside so as to produce a lifting draught underneath the parachute for unfolding this latter.

By well known means this clockwork 30 can be regulated so that arm 31 will act after a predetermined time on latch 27 so as to free the flap whereupon spring 23 will push the folded parachute up between the wind screen where it is exposed to the draught produced by the guiding surfaces 32.

What I claim as new is:

In an automatic unfolding-device for parachutes a casing with movable bottom and springing flap-cover, extensible means underneath said bottom and adapted to push said bottom to the outside, a folded parachute attached to said bottom and clamped between bottom and flap-cover, a latch locking said flap-cover, a timed clock-worked unlocking device of said latch, a wind-screen arranged on top of said casing and openings in said screen and provided with guiding surfaces adapted to direct an air draught under the parachute substantially as shown and set forth.

In testimony whereof I affix my signature.

MARCEL KÜNZER.